United States Patent [19]
Ausbeck, Jr.

[11] Patent Number: 6,128,417
[45] Date of Patent: Oct. 3, 2000

[54] IMAGE PARTITION MOMENT OPERATORS

[76] Inventor: Paul J. Ausbeck, Jr., 74 Carlyn Ave., Campbell, Calif. 95008

[21] Appl. No.: 08/870,758

[22] Filed: Jun. 9, 1997

[51] Int. Cl.$^7$ ..................................................... G06F 9/36
[52] U.S. Cl. .......................................... 382/288; 382/282
[58] Field of Search ................................. 382/288, 276, 382/277, 282, 285, 298, 299, 173; 704/220; 371/5.1; 375/233

[56] References Cited

U.S. PATENT DOCUMENTS

| | | | |
|---|---|---|---|
| 4,669,120 | 5/1987 | Ono | 704/216 |
| 5,265,167 | 11/1993 | Akamine et al. | 704/220 |
| 5,548,293 | 8/1996 | Cohen | 342/357 |
| 5,630,154 | 5/1997 | Bolstad et al. | 395/800.19 |
| 5,754,181 | 5/1998 | Amdursky et al. | 345/419 |
| 5,768,284 | 6/1998 | Cox | 371/5.1 |
| 5,790,598 | 8/1998 | Moreland | 375/233 |

*Primary Examiner*—Andrew W. Johns
*Assistant Examiner*—Gregory Desire

[57] ABSTRACT

The method determines how transformations in a piecewise-polynomial image model affect the model's fidelity. Up to third order two-dimensional polynomials are supported. The fidelity measure is the total squared error between model predictions and pixel values. The transformations supported are merging two domains, adding a single pixel or a group of pixels to a domain, removing a single pixel or a group of pixels from a domain, and altering the intensity value of a sample or group of samples from a surface over a domain. Details are disclosed for applying the method to 256 level images up to 640×480 pixels in size. Also disclosed is a procedure for efficiently performing coordinate transformations on two-dimensional moment vectors that extends the method to arbitrarily sized images. A disclosed procedure for efficiently converting a domain's moment vector to a least squares polynomial coefficient vector and automatically zeroing unsupported coefficients makes the method useful for freeform domains. The conversion procedure is an extension of the Cholesky factorization for symmetric positive definite systems to semidefinite systems.

6 Claims, 19 Drawing Sheets

$$\begin{bmatrix} S & S_y & S_x & 0' & S_{y^2} & S_{x^2} \\ S_y & S_{y^2} & S_{xy} & 0' & S_{y^3} & S_{x^2y} \\ S_x & S_{xy} & S_{x^2} & 0' & S_{xy^2} & S_{x^3} \\ 0' & 0' & 0' & 0 & 0''' & 0''' \\ S_{y^2} & S_{y^3} & S_{xy^2} & 0'' & S_{y^4} & S_{x^2y^2} \\ S_{x^2} & S_{x^2y} & S_{x^3} & 0'' & S_{x^2y^2} & S_{x^4} \end{bmatrix}$$

$$\begin{bmatrix} S & S_y & S_x & 0' & S_{y^2} & S_{x^2} \\ S_y & S_{y^2} & S_{xy} & 0' & S_{y^3} & S_{x^2y} \\ S_x & S_{xy} & S_{x^2} & 0' & S_{xy^2} & S_{x^3} \\ 0' & 0' & 0' & 0 & 0''' & 0''' \\ S_{y^2} & S_{y^3} & S_{xy^2} & 0'' & S_{y^4} & S_{x^2y^2} \\ S_{x^2} & S_{x^2y} & S_{x^3} & 0'' & S_{x^2y^2} & S_{x^4} \end{bmatrix}$$

FIG. 1 factor(A)
{
    for $i := 1$ to $|\mathbf{P}| - 1$
    {
        $u := \kappa \cdot \varepsilon \cdot a_{ii}$
        for $j := 0$ to $i - 1$
        {
            for $k := 0$ to $j - 1$
                $a_{ji} \mathrel{-}= a_{ki} \cdot a_{jk}$
            if $a_{jj} > 0$ then $a_{ij} := a_{ji}/a_{jj}$ else $a_{ij} := 0$
            $a_{ii} \mathrel{-}= a_{ij} \cdot a_{ji}$
        }
        if $a_{ii} < u$ then $a_{ii} := 0$
    }
}

FIG. 2 substitute(A, b)
{
    for $i := 1$ to $|\mathbf{P}| - 1$
        for $j := 0$ to $i - 1$
            $b_i \mathrel{-}= a_{ij} \cdot b_j$
    for $i := |\mathbf{P}| - 1$ down to $0$
    {
        for $j := |\mathbf{P}| - 1$ down to $i + 1$
            $b_i \mathrel{-}= a_{ij} \cdot b_j$
        if $a_{ii} > 0$ then $b_i := b_i / a_{ii}$ else $b_i := 0$
    }
}

FIG. 3

$\text{natural\_fill}_0(\mathbf{A}, \mathbf{S})$ $\{$ $\quad a_{00} := S_{\_}$ $\}$

FIG. 4

$\text{natural\_fill}_1(\mathbf{A}, \mathbf{S})$ $\{$ $\quad \text{natural\_fill}_0(\mathbf{A}, \mathbf{S})$ $\quad a_{01} := S_y$ $\quad a_{02} := S_x$ $\quad a_{11} := S_{y^2}$ $\quad a_{12} := S_{xy}$ $\quad a_{22} := S_{x^2}$ $\}$

FIG. 5 forced_fill$_0$(b, S)
{
    $b_0 := S_z$
}

FIG. 6 forced_fill$_1$(b, S)
{
    forced_fill$_0$(b, S)
    $b_1 := S_{yz}$
    $b_2 := S_{xz}$
}

FIG. 7

```
solve(M, b)
{
    natural_fill(A, M)
    forced_fill(b, M)
    factor(A)
    substitute(A, b)
}
```

FIG. 8

```
add(S, p)
{
    x_acc := 1
    for i := 0 to 2P_max
    {
        y_acc := x_acc
        for j := 0 to 2P_max - i
        {
            S_{x^i y^j} += y_acc
            y_acc *= p_y
        }
        x_acc *= p_x
    }
    x_acc := p_z
    for i := 0 to P_max
    {
        y_acc := x_acc
        for j := 0 to P_max - i
        {
            S_{x^i y^j z} += y_acc
            y_acc *= p_y
        }
        x_acc *= p_x
    }
    S_{z^2} += p_z^2
}
```

FIG. 9 remove(S, p)
{
    $x_{acc} := 1$
    for $i := 0$ to $2P_{max}$
    {
        $y_{acc} := x_{acc}$
        for $j := 0$ to $2P_{max} - i$
        {
            $S_{x^i y^j} -= y_{acc}$
            $y_{acc} *= p_y$
        }
        $x_{acc} *= p_x$
    }
    $x_{acc} := p_z$
    for $i := 0$ to $P_{max}$
    {
        $y_{acc} := x_{acc}$
        for $j := 0$ to $P_{max} - i$
        {
            $S_{x^i y^j z} -= y_{acc}$
            $y_{acc} *= p_y$
        }
        $x_{acc} *= p_x$
    }
    $S_{z^2} -= p_z^2$
}

FIG. 10

$$\text{zadjust}(\mathbf{S}, p, z_{new})$$
{
$\quad x_{acc} := z_{new} - p_z$
$\quad$ for $i := 0$ to $P_{max}$
$\quad$ {
$\quad\quad y_{acc} := x_{acc}$
$\quad\quad$ for $j := 0$ to $P_{max} - i$
$\quad\quad$ {
$\quad\quad\quad S_{x^i y^j z} += y_{acc}$
$\quad\quad\quad y_{acc} *= p_y$
$\quad\quad$ }
$\quad\quad x_{acc} *= p_x$
$\quad$ }
$\quad S_{z^2} = S_{z^2} + z_{new}^2 - p_z^2$
}

FIG. 11

$\text{pshiftx}_n(\mathbf{c}, d)$

{ for $k := 0$ to $n - 1$ for $j := 0$ to $n - k - 1$ for $i := n - k$ down to $j + 1$ $c_{x^{i-1}y^k} \mathrel{+}= d \cdot c_{x^i y^k}$

$$\text{pshifty}_n(\mathbf{c}, d)$$
$$\{$$
$$\quad \text{for } k := 0 \text{ to } n-1$$
$$\quad\quad \text{for } j := 0 \text{ to } n-k-1$$
$$\quad\quad\quad \text{for } i := n-k \text{ down to } j+1$$
$$\quad\quad\quad\quad c_{x^k y^{i-1}} \mathrel{+}= d \cdot c_{x^k y^i}$$
$$\}$$

FIG. 13

$$\text{pshift}(\mathbf{c}, x, y)$$
$$\{$$
$$\quad \text{pshiftx}(\mathbf{c}, x)$$
$$\quad \text{pshifty}(\mathbf{c}, y)$$
$$\}$$

FIG. 14 mshift(S, *x*, *y*)
{
    mshiftx(S, *x*)

mshifty(S, *y*)
}

FIG. 15

$\text{mshiftx}_n(\mathbf{S}, d)$

{ for $k := 0$ to $2n - 1$ for $j := 0$ to $2n - k - 1$ for $i := 2n - k$ down to $j + 1$ $$S_{x^i y^k} \mathrel{+}= d \cdot S_{x^{i-1} y^k}$$

for $k := 0$ to $n - 1$ for $j := 0$ to $n - k - 1$ for $i := n - k$ down to $j + 1$ $$S_{x^i y^k z} \mathrel{+}= d \cdot S_{x^{i-1} y^k z}$$

$$\text{mshifty}_n(\mathbf{S}, d)$$

{ for $k := 0$ to $2n - 1$ for $j := 0$ to $2n - k - 1$ for $i := 2n - k$ down to $j + 1$ $$S_{x^k y^i} += d \cdot S_{x^k y^{i-1}}$$

for $k := 0$ to $n - 1$ for $j := 0$ to $n - k - 1$ for $i := n - k$ down to $j + 1$ $$S_{x^k y^i z} += d \cdot S_{x^k y^{i-1} z}$$

}

FIG. 17 checked_forced_error$_n$(S, c, $E$)
{
   if ($S_{x^{2n}} < 0$)

$E := $ PRECISION_MAX else if ($S_{y^{2n}} < 0$)

$E := $ PRECISION_MAX else $E := E_F(\mathbf{S}, \mathbf{c})$
}

FIG. 19 merge_delta($\mathbf{M}_A, \mathbf{M}_B, \Delta E$)
{
    $\mathbf{M}_C = \mathbf{M}_A + \mathbf{M}_B$
    solve($\mathbf{M}_A, \mathbf{P}_A$)
    solve($\mathbf{M}_B, \mathbf{P}_B$)
    solve($\mathbf{M}_C, \mathbf{P}_C$)
    $\Delta E = E_F(\mathbf{M}_C, \mathbf{P}_C) - E_F(\mathbf{M}_A, \mathbf{P}_A) - E_F(\mathbf{M}_B, \mathbf{P}_B)$
}

FIG. 20

$$\text{move\_delta}(\mathbf{M}_A, \mathbf{M}_B, \mathbf{M}_V, \Delta E)$$
{
$$\mathbf{M}_C = \mathbf{M}_A + \mathbf{M}_V$$
$$\mathbf{M}_D = \mathbf{M}_A - \mathbf{M}_V$$
$$\text{solve}(\mathbf{M}_A, \mathbf{P}_A)$$
$$\text{solve}(\mathbf{M}_B, \mathbf{P}_B)$$
$$\text{solve}(\mathbf{M}_C, \mathbf{P}_C)$$
$$\text{solve}(\mathbf{M}_D, \mathbf{P}_D)$$
$$\Delta E = E_F(\mathbf{M}_C, \mathbf{P}_C) + E_F(\mathbf{M}_D, \mathbf{P}_D) - E_F(\mathbf{M}_A, \mathbf{P}_A) - E_F(\mathbf{M}_B, \mathbf{P}_B)$$
}

FIG. 21 adjust_delta($\mathbf{M}_A, \mathbf{A}_S, f, \mathbf{M}_S, p, z_{new}, \Delta E$)
{
   if $f <> 0$
   {
      natural_fill($\mathbf{A}_S, \mathbf{M}_S$)
      factor($\mathbf{A}_S$)
   }
   forced_fill($\mathbf{M}_S, \mathbf{P}_S$)
   substitute($\mathbf{A}_S, \mathbf{P}_S$)
   $E_{old} := E(\mathbf{M}_A, \mathbf{P}_S)$
   zadjust($\mathbf{M}_S, p, z_{new}$)
   forced_fill($\mathbf{M}_S, \mathbf{P}_S$)
   substitute($\mathbf{A}_S, \mathbf{P}_S$)
   $\Delta E := E(\mathbf{M}_A, \mathbf{P}_S) - E_{old}$
}

FIG. 22

IMAGE PARTITION MOMENT OPERATORS

FIELD OF THE INVENTION

The invention relates to image partitioning or segmentation. It is applicable to image processing, image coding, computer graphics, and computer vision. The invention is generally applicable to the problem of approximating two-dimensional fields with polynomial surfaces.

REFERENCES

Xiaolin Wu and Yonggang Fang, "Segmentation-Based Image Coding", Proc. Data Compression Conference, Snowbird, Utah, Mar. 30, 1993, pp. 262–271.

Murat Kunt, Michel Benard, and Riccardo Leonardi, "Recent Results in High-Compression Image Coding", IEEE Transactions on Circuits and Systems, Vol. CAS-34, No. 11, November 1987, 1306–1336.

BACKGROUND

Partitioning is a well known problem in image processing and computer vision. When an image is partitioned each pixel is assigned to one of a multiplicity of domains. In conventional partitioning methods, domain membership is determined by similarity or dissimilarity criteria.

More recently, several methods using two-dimensional image models and global optimization have been developed. Model based partitioning schemes approximate the pixels of each domain with an analytic intensity function. The analytic functions universally used for this purpose are two-dimensional polynomials. Since third order polynomials are sufficient to provide boundary continuity in both the function and its derivative they are typically the largest used.

Model based partitioning methods begin with an initial "seed" partition and make successive transformations that balance model complexity against model fidelity. Model complexity criteria include domain count and domain shape. Model fidelity is typically measured on a per pixel basis with each pixel's actual value being compared with its corresponding modeled value. An overall fidelity measure is obtained by aggregating the individual errors.

For example, a common partitioning operation is domain merge. When two domains are merged, model complexity is reduced since there are fewer domains and less domain periphery. Model fidelity suffers, however, since the combined domain's pixels, formerly modeled with two polynomials, must be modeled with one. The goal of the partitioning process is to make a sequence of transformations that results in a model with an overall balance of complexity and fidelity.

Unfortunately, the problem of determining a transformation's impact on model fidelity is computationally expensive. In many situations the square of the error between each pixel and its modeled value is an appropriate base for fidelity computations. If so, least squares methods can be used to reduce computational complexity.

Least Squares Methods

The principles of least squares data modeling are best illustrated by the widely used linear regression technique. Linear regression is method for fitting data points to a straight line model $$y(x)=mx+b. \qquad (1)$$

The model obtained is optimal in the sense that the sum of the squared error between it and the data points $$E(m, b) = \sum_i (y_i - mx_i - b)^2 \qquad (2)$$

is minimal. Since a local extremum exists where partial derivatives of the error metric are equal to zero, the model parameters can be found by differentiating with respect to each parameter and solving the resulting system of equations $$0 = \frac{\partial E}{\partial b} = -2\sum_i (y_i - mx_i - b) \qquad (3)$$

$$0 = \frac{\partial E}{\partial m} = -2\sum_i x_i(y_i - mx_i - b).$$

An important aspect of the least squares error metric is that a solution for the model parameters b and m and the minimum error E can be formulated solely in terms of ensemble statistics. If the following sums are defined $$S \equiv \sum_i 1 \quad S_x \equiv \sum_i x_i \quad S_y \equiv \sum_i y_i \qquad (4)$$

$$S_{x^2} \equiv \sum_i x_i^2 \quad S_{xy} \equiv \sum_i x_i y_i \quad S_{y^2} \equiv \sum_i y_i^2 ,$$

then b and m are calculated as follows $$b = \frac{S_{x^2}S_y - S_xS_{xy}}{SS_{x^2} - S_x^2}, \qquad (5)$$

$$m = \frac{S_xS_{xy} - S_xS_y}{SS_{x^2} - S_x^2}$$

and E is $$E = S_{y^2} - 2(mS_{xy} + bS_y) + 2bmS_x + m^2 S_{x^2} + b^2 S. \qquad (6)$$

By formulating the desired result in terms of ensemble statistics, a data point can be added to the set being modeled by simply adding to the ensembles $$S := S+1 \ S_x := S_x + x_i \ S_y := S_y + y_i \ S_{x^2} := S_{x^2} + x_i^2 \ S_{xy} := S_{xy} + x_i y_i \ S_{y^2} := S_{y^2} + y_i^2, \qquad (7)$$

and the new optimum model parameters can be recalculated using (5). Points can be removed from the data set using an analogous subtraction procedure. The key idea is that no matter how many points are being modeled, a point can be added or subtracted and new model parameters calculated using only a fixed number of mathematical operations.

The ensemble technique can be extended to higher order polynomials and many other types of approximating functions. In the general least squares problem the systems of equations derived from differentiation with respect to model parameters are called the normal equations and are commonly represented in matrix form as $$A \cdot x = b. \qquad (8)$$

For example the normal equations for the model function $$y(x) = ax^2 + bx + c \qquad (9)$$

are $$\begin{bmatrix} S_{x^4} & S_{x^3} & S_{x^2} \\ S_{x^3} & S_{x^2} & S_x \\ S_{x^2} & S_x & S \end{bmatrix} \cdot \begin{bmatrix} a \\ b \\ c \end{bmatrix} = \begin{bmatrix} S_{x^2 y} \\ S_{xy} \\ S_y \end{bmatrix}. \quad (10)$$

Like any other matrix equation, the normal equations can be solved with standard matrix solution techniques such as Gauss-Jordan elimination or LU decomposition and back substitution. Also, since A is symmetric and positive the Cholesky factorization is applicable. By taking advantage of symmetry, the Cholesky method requires only one half of the number of mathematical operations required by the fastest general elimination technique.

Unfortunately, A is often singular, or nearly so, and standard techniques yield incorrect results. The singular value decomposition is the most widely used technique for solving singular systems. However, on small matrices such as the normal equations the singular value decomposition requires significantly more computation than standard techniques.

PRIOR ART

A common tactic to make use of least squares methods in image partitioning is to place restrictions on domain shape. An O(1) method for finding the optimal rectilinear or diagonal cut of a domain is disclosed by Wu et al in "Segmentation-Based Image Coding", Proc. Data Compression Conference, Snowbird, Utah, Mar. 30, 1993, pp. 262–271. Methods applicable to evenly splitting and merging square domains modeled by up to third order polynomials are disclosed by Kunt, et al in "Recent Results in High-Compression Image Coding", IEEE Transactions on Circuits and Systems, Vol. CAS-34, No. 11, November 1987, 1306–1336.

Neither of these methods address the underdetermined matrices that occur when fitting higher order polynomials to freeform domains. The method of Wu et al largely avoids the problems by using only linear polynomials. The method of Kunt et al is restricted to squares large enough to support the highest polynomial order in use.

Therefore, there is a need for a method that efficiently measures fidelity changes when making partition transformations that are unrestricted by shape. The method should be stable for complex domain shapes and polynomials up to third order. Further, higher order models should be automatically reduced when there is insufficient data to support them.

SUMMARY OF THE INVENTION

Given a piecewise-analytic model of a digital image, the invention relates to a method for determining how certain transformations affect the model's fidelity. The applicable transformations are merging two domains, adding a single pixel or a group of pixels to a domain, removing a single pixel or a group of pixels from a domain, and altering the intensity value of a sample or group of samples from a surface over a domain. Model fidelity is measured in the least squares sense.

The applicable model functions are the maximal two-dimensional polynomials of order one, two, and three. Moment vectors for these polynomials are defined and used to facilitate fidelity measurements. The moment vectors are appropriate for image sizes up to 640×480 pixels when using a single reference coordinate system. A method for efficiently performing two-dimensional coordinate transformations on moment vectors extends their use to arbitrarily sized images.

No restrictions are placed on domain shape, and model complexity is automatically reduced for domains with insufficient support for a given model order. The method for determining the supported model terms is an improvement of the Cholesky factorization for symmetric positive definite systems that extends it to semidefinite systems. The improved factorization is applicable to solving general least squares problems.

BRIEF DESCRIPTION OF THE DRAWINGS

FIG. 1 shows how certain elements of a matrix factored in accordance with the present invention become zero or effectively zero.

FIG. 2 is pseudocode for a method for factoring symmetric positive semidefinite matrices in accordance with the present invention.

FIG. 3 is pseudocode for a method for using a matrix factored in accordance with the present invention to obtain the coefficients of an approximating polynomial.

FIG. 4 is pseudocode for a method for initializing a least squares system matrix with a zero order moment vector in accordance with the present invention.

FIG. 5 is pseudocode for a method for initializing a least squares system matrix with a first order moment vector in accordance with the present invention.

FIG. 6 is pseudocode for a method for initializing a least squares parameter vector with a zero order moment vector in accordance with the present invention.

FIG. 7 is pseudocode for a method for initializing a least squares parameter vector with a first order moment vector in accordance with the present invention.

FIG. 8 is pseudocode for a method for solving for the least squares polynomial of a moment vector in accordance with the present invention.

FIG. 9 is pseudocode for a method for adding a pixel contribution to a moment vector in accordance with the present invention.

FIG. 10 is pseudocode for a method for removing a pixel contribution from a moment vector in accordance with the present invention.

FIG. 11 is pseudocode for a method for updating the intensity value of a pixel's contribution to a moment vector in accordance with the present invention.

FIG. 12 is pseudocode for a method for shifting the horizontal coordinate origin of a two-dimensional polynomial in accordance with the present invention.

FIG. 13 is pseudocode for a method for shifting the vertical coordinate origin of a two-dimensional polynomial in accordance with the present invention.

FIG. 14 is pseudocode for a method for shifting the coordinate system of a two-dimensional polynomial in accordance with the present invention.

FIG. 15 is pseudocode for a method for shifting the coordinate system of a two-dimensional moment vector in accordance with the present invention.

FIG. 16 is pseudocode for a method for shifting the horizontal coordinate origin of a two-dimensional moment vector in accordance with the present invention.

FIG. 17 is pseudocode for a method for shifting the vertical coordinate origin of a two-dimensional moment vector in accordance with the present invention.

FIG. 19 is pseudocode for performing bounds checks as part of a forced error computation and preventing moment vector overflow by returning maximal error in accordance with the present invention.

FIG. 20 is pseudocode for determining in accordance with the present invention how model fidelity would be affected by a proposed merger of two domains.

FIG. 21 is pseudocode for determining in accordance with the present invention how model fidelity would be affected by a proposed transfer of pixels from one domain to another.

FIG. 22 is pseudocode in accordance with the present invention for adjusting the value of one of the samples of a sample fitted polynomial and determining the squared error between the adjusted polynomial and the pixels of the domain from which the samples are taken.

DETAILED DESCRIPTION OF THE INVENTION

Approximating Polynomials

Figure 18:
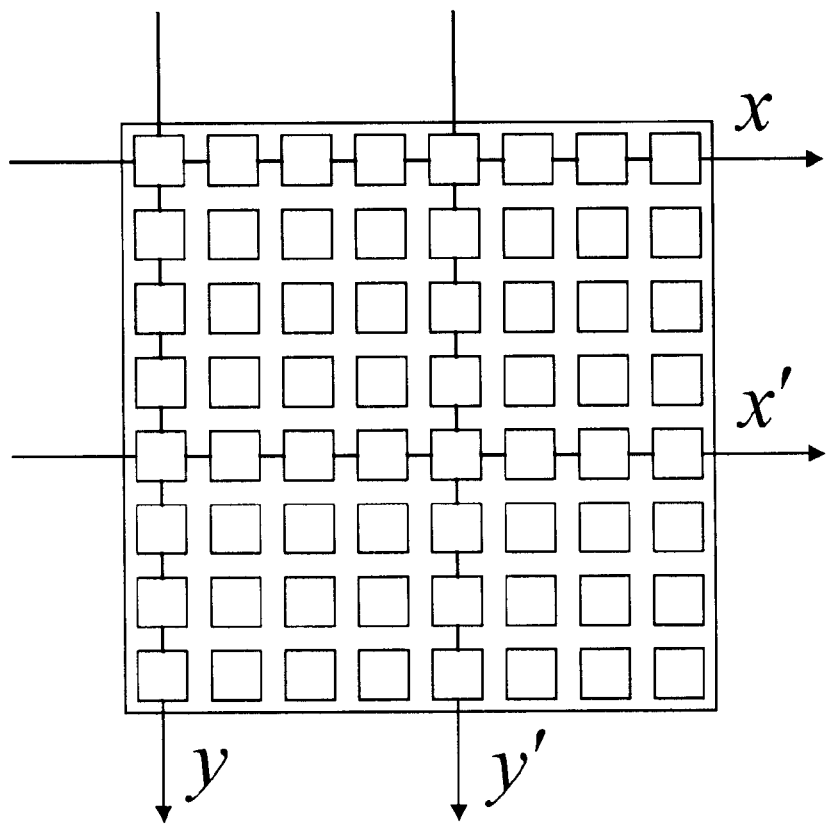
FIG. 18 shows conventional and central coordinate axis for a digital image.

In model based image partitioning, the analytic functions used to approximate pixel intensities in each domain are two-dimensional polynomials. Such polynomials are commonly classified by their highest combined power of x and y. For a given highest power, the polynomial containing all possible terms has the best isotropic behavior. The largest power of a maximal two-dimensional polynomial is its order, symbolically denoted $P_{max}$. The first four maximal two-dimensional polynomials are $$f_0(x,y) \equiv c_-, \qquad (11)$$

$$f_1(x,y) \equiv c_x x + c_y y + f_0(x,y), \qquad (12)$$

$$f_2(x,y) \equiv c_{x^2} x^2 + c_{y^2} y^2 + c_{xy} xy + f_1(x,y), \qquad (13)$$

$$f_3(x,y) \equiv c_{x^3} x^3 + c_{y^3} y^3 + c_{x^2 y} x^2 y + c_{xy^2} xy^2 + f_2(x,y). \qquad (14)$$

Since the largest polynomial of interest has only ten terms, a useful polynomial representation is a vector of coefficients P. So that lower order vectors can be obtained from higher order vectors by simple truncation, it is desirable to embed each vector in the vector of the next highest order. One such embedding is $$P_0 \equiv [c_-], \quad P_1 \equiv \begin{bmatrix} P_0 \\ c_y \\ c_x \end{bmatrix}, \quad P_2 \equiv \begin{bmatrix} P_1 \\ c_{xy} \\ c_{y^2} \\ c_{x^2} \end{bmatrix}, \quad P_3 \equiv \begin{bmatrix} P_2 \\ c_{y^2 x} \\ c_{x^2 y} \\ c_{y^3} \\ c_{x^3} \end{bmatrix}. \qquad (15)$$

Moment Sums

To apply least squares techniques to model based image partitioning, appropriate moment sums must be maintained for each domain. In two dimensions, moment sums are formed from up to two independent variables and one dependent variable. A notation similar to the introductory one dimensional shorthand results if y is used as the second independent variable and z is added as the dependent intensity variable. For example, the sum over all the pixels in a domain of each pixel's x coordinate multiplied by its y coordinate multiplied by its intensity is defined as $$S_{xyz} \equiv \sum_{p \in D} x_p y_p z_p, \qquad (16)$$

and the sum of the square of each pixel's x coordinate multiplied by the cube of its y coordinate is defined as $$S_{x^2 y^3} \equiv \sum_{p \in D} x_p^2 y_p^3. \qquad (17)$$

To help simplify the following discussion it is convenient to divide the moment sums into two categories, those that contain the intensity variable z and those that do not. The forcing moments encapsulate how the intensity variable z interacts with domain geometry. The natural moments are obtained solely from domain geometry. The sum over a domain of the square of individual pixel intensities $$U \equiv [S_{z^2}]. \qquad (18)$$

is separately designated the energy moment. U is not needed to solve the normal equations for an approximating polynomial but is needed to obtain the error between the pixel intensities predicted by an approximating polynomial and their actual values.

Moment Vectors

The particular moments that must be maintained for each domain in an image partition are determined by the order of the model driving the partitioning process. Higher order models require more moments than lower order models. As with polynomial coefficients, the most straightforward representation for the required moment sums is a vector. A domain's moment vector is formed from its energy, natural, and forcing moments. It is useful to order the moment sums in such a way that lower order moment vectors are embedded in higher order vectors.

The zero order natural moment vector $$N_0 \equiv [S] \qquad (19)$$

contains only one component, the number of pixels comprising a domain. The corresponding forcing moment vector $$F_0 \equiv [S_z] \qquad (20)$$

contains the sum of a domain's pixel values. The zero order moment vector is the concatenation of the energy moment and the zero order natural and forcing moments $$M_0 \equiv \begin{bmatrix} U \\ N_0 \\ F_0 \end{bmatrix}. \qquad (21)$$

Higher order moment vectors are formed by concatenating additional moments to lower order vectors. Defining the additional portion of the first order natural moment vector as $$N_{1-0} \equiv \begin{bmatrix} S_y \\ S_x \\ S_{xy} \\ S_{y^2} \\ S_{x^2} \end{bmatrix}, \quad (22)$$

the first order natural moment vector is $$N_1 \equiv \begin{bmatrix} N_0 \\ N_{1-0} \end{bmatrix}. \quad (23)$$

Similarly the additional portion and totality of the first order forcing moment vector are $$F_{1-0} \equiv \begin{bmatrix} S_{yz} \\ S_{xz} \end{bmatrix}, \quad F_1 \equiv \begin{bmatrix} F_0 \\ F_{1-0} \end{bmatrix}. \quad (24)$$

Embedding the zero order vector in the additional portions of the natural and forcing moment vectors yields the first order moment vector $$M_1 \equiv \begin{bmatrix} M_0 \\ N_{1-0} \\ F_{1-0} \end{bmatrix}. \quad (25)$$

Extending the notation to higher order yields the second order $$N_{2-1} \equiv \begin{bmatrix} S_{xy^2} \\ S_{x^2 y} \\ S_{y^3} \\ S_{x^3} \\ S_{xy^3} \\ S_{x^2 y^2} \\ S_{x^3 y} \\ S_{y^4} \\ S_{x^4} \end{bmatrix}, \quad N_2 \equiv \begin{bmatrix} N_1 \\ N_{2-1} \end{bmatrix}, \quad F_{2-1} \equiv \begin{bmatrix} S_{xyz} \\ S_{y^2 z} \\ S_{x^2 z} \end{bmatrix}, \quad (26)$$

$$F_2 \equiv \begin{bmatrix} F_1 \\ F_{2-1} \end{bmatrix}, \quad M_2 \equiv \begin{bmatrix} M_1 \\ N_{2-1} \\ F_{2-1} \end{bmatrix},$$

and third order $$N_{3-2} \equiv \begin{bmatrix} S_{xy^4} \\ S_{x^2 y^3} \\ S_{x^3 y^2} \\ S_{x^4 y} \\ S_{y^5} \\ S_{x^5} \\ S_{xy^5} \\ S_{x^2 y^4} \\ S_{x^3 y^3} \\ S_{x^4 y^2} \\ S_{x^5 y} \\ S_{y^6} \\ S_{x^6} \end{bmatrix}, \quad N_3 \equiv \begin{bmatrix} N_2 \\ N_{3-2} \end{bmatrix}, \quad F_{3-2} \equiv \begin{bmatrix} S_{xy^2 z} \\ S_{x^2 yz} \\ S_{y^3 z} \\ S_{x^3 z} \end{bmatrix}, \quad (27)$$

$$F_3 \equiv \begin{bmatrix} F_2 \\ F_{3-2} \end{bmatrix}, \quad M_3 \equiv \begin{bmatrix} M_2 \\ N_{3-2} \\ F_{3-2} \end{bmatrix}.$$

moment vectors.

Least Squares Normal Equations

A moment vector is converted to a polynomial coefficient vector by solving an appropriate system of least squares normal equations. In the matrix form of the normal equations, A·x=b, the vector x contains the unknown polynomial coefficients, the vector b contains forcing moments, and the matrix A contains natural moments. The matrix is arranged symmetrically such that the lowest order natural moments comprise its first row and column without replication, and the natural moments whose subscripts correspond to the multiplication of the heads of each intersecting row and column comprise its subsequent rows and columns.

The exact arrangement of the normal equations is dependent upon the arrangement of the unknown polynomial. The Cholesky solution procedure of the next section requires that the polynomial be arranged in such a way that lower order polynomials are embedded in higher order polynomials. One such arrangement is that of the previously defined coefficient vectors P (15). If x is arranged in the same order P, then b is populated with the forcing moments $$b_0 = F_0, b_1 = F_1, b_2 = F_2, b_3 = F_3. \quad (28)$$

and A is populated with the natural moments as follows $$A_0 \equiv [S], \tag{29}$$

$$A_1 \equiv \begin{bmatrix} S & S_y & S_x \\ S_y & S_{y^2} & S_{xy} \\ S_x & S_{xy} & S_{x^2} \end{bmatrix}, \tag{30}$$

$$A_2 \equiv \begin{bmatrix} S & S_y & S_x & S_{xy} & S_{y^2} & S_{x^2} \\ S_y & S_{y^2} & S_{xy} & S_{xy^2} & S_{y^3} & S_{x^2y} \\ S_x & S_{xy} & S_{x^2} & S_{x^2y} & S_{xy^2} & S_{x^3} \\ S_{xy} & S_{xy^2} & S_{x^2y} & S_{x^2y^2} & S_{xy^3} & S_{x^3y} \\ S_{y^2} & S_{y^3} & S_{xy^2} & S_{xy^3} & S_{y^4} & S_{x^2y^2} \\ S_{x^2} & S_{x^2y} & S_{x^3} & S_{x^3y} & S_{x^2y^2} & S_{x^4} \end{bmatrix}, \tag{31}$$

$$A_3 \equiv \begin{bmatrix} S & S_y & S_x & S_{xy} & S_{y^2} & S_{x^2} & S_{xy^2} & S_{x^2y} & S_{y^3} & S_{x^3} \\ S_y & S_{y^2} & S_{xy} & S_{xy^2} & S_{y^3} & S_{x^2y} & S_{xy^3} & S_{x^2y^2} & S_{y^4} & S_{x^3y} \\ S_x & S_{xy} & S_{x^2} & S_{x^2y} & S_{xy^2} & S_{x^3} & S_{x^2y^2} & S_{x^3y} & S_{xy^3} & S_{x^4} \\ S_{xy} & S_{xy^2} & S_{x^2y} & S_{x^2y^2} & S_{xy^3} & S_{x^3y} & S_{x^2y^3} & S_{x^3y^2} & S_{xy^4} & S_{x^4y} \\ S_{y^2} & S_{y^3} & S_{xy^2} & S_{xy^3} & S_{y^4} & S_{x^2y^2} & S_{xy^4} & S_{x^2y^3} & S_{y^5} & S_{x^3y^2} \\ S_{x^2} & S_{x^2y} & S_{x^3} & S_{x^3y} & S_{x^2y^2} & S_{x^4} & S_{x^3y^2} & S_{x^4y} & S_{x^2y^3} & S_{x^5} \\ S_{xy^2} & S_{xy^3} & S_{x^2y^2} & S_{x^2y^3} & S_{xy^4} & S_{x^3y^2} & S_{x^2y^4} & S_{x^3y^3} & S_{xy^5} & S_{x^4y^2} \\ S_{x^2y} & S_{x^2y^2} & S_{x^3y} & S_{x^3y^2} & S_{x^2y^3} & S_{x^4y} & S_{x^3y^3} & S_{x^4y^2} & S_{x^2y^4} & S_{x^5y} \\ S_{y^3} & S_{y^4} & S_{xy^3} & S_{xy^4} & S_{y^5} & S_{x^2y^3} & S_{xy^5} & S_{x^2y^4} & S_{y^6} & S_{x^3y^3} \\ S_{x^3} & S_{x^3y} & S_{x^4} & S_{x^4y} & S_{x^3y^2} & S_{x^5} & S_{x^4y^2} & S_{x^5y} & S_{x^3y^3} & S_{x^6} \end{bmatrix}. \tag{32}$$

Cholesky Factorization for Positive Semidefinite Matrices

The matrix A of the least squares normal equations is symmetric. It is also positive, but since it can be non-invertible it is not necessarily definite. In other words, the data can be insufficient to support all the coefficients of the modeling function. For example, a domain that is only one pixel wide cannot support polynomial terms containing x, or a domain that is only one pixel tall cannot support terms in y.

For small symmetric positive definite matrices, the fastest known solution technique is the Cholesky factorization $$A = L \cdot D \cdot L^T. \tag{33}$$

The factorization is performed in place with the factorization taking the place of the original matrix elements. L takes the place of the elements below the diagonal, D appears on the diagonal, and $D \cdot L^T$ replaces the elements above the diagonal.

The inner loop of the Cholesky method modifies the elements on or above the diagonal by a sequence of multiply-subtract operations. The factorization proceeds in column major order from the left and then down each row from the top $$a_{ij} := a_{ij} - \sum_{k=0}^{i-1} a_{ik} \cdot a_{kj}. \tag{34}$$

After each element above the diagonal is calculated it is reflected symmetrically across the diagonal by dividing by the same row diagonal element $$a_{ji} := \frac{a_{ij}}{a_{ii}}. \tag{35}$$

For example, the order of calculation for a 3×3 matrix is

| 0  | 1  | 3  |
|----|----|----|
| 1' | 2  | 4, |
| 3' | 4' | 5  | with the primed values indicating reflection across the diagonal. The calculation order ensures that the final value of each element of the factorization is available before it is needed for calculation of subsequent elements.

Once A has been factored, in place forward substitution (i increasing)

$$b_i := b_i - \sum_{j=0}^{i-1} a_{ij} \cdot b_j \tag{36}$$

and backward substitution (i decreasing)

$$b_i := \frac{b_i - \sum_{j=i+1}^{n-1} a_{ij} \cdot b_j}{a_{ii}} \tag{37}$$

deliver the solution into b.

The diagonal elements, D, of the factorization are the pivots of the original matrix A. If any of the members of D are zero, the factorization fails since division by zero as would occur in (35) is undefined. Further, if any d, is near zero, the resulting factorization can become inaccurate. Small inaccuracies occurring early in the factorization are amplified as the calculation proceeds leading to large errors in the rightmost and bottommost elements of L and D.

Least squares systems on which the Cholesky factorization fails have insufficient data to support all the terms of the approximating polynomial. Unfortunately, it is not always easy to decide which polynomial coefficients are supported by a given a domain. However, with the following improvements, the Cholesky method can both produce accurate solutions and determine the supported polynomial terms.

The first aspect of the Cholesky method of note is that the final value of each element of the factorization is independent of values below or to the right. If the normal equations are organized so the lower order polynomial terms are on the left, the factorization begins the same no matter how large the ultimate polynomial order. The matrices (29)–(32) are arranged to take advantage of this property.

The second important aspect of the Cholesky method is that if the row and column of zero diagonal elements are removed as they occur in the computation, the result is the same as if the zeroed rows and columns were not included initially. Removing a row and column from A has the affect of removing a polynomial term from the approximating polynomial f, which is exactly the desired behavior.

The following property of positive matrices leads to a method for dynamically removing unsupported rows and columns of A.

All the diagonal elements and all of the pivots of a positive definite matrix are positive. The implication of this property is that the diagonal elements of A are non-negative both before and after factorization. Since the lower elements of the factorization are obtained by dividing the corresponding upper element by a positive diagonal element, $a_{if}$ and $a_{fi}$ always have the same sign, the product $a_{if} \cdot a_{fi}$ is always positive, and the diagonal elements $a_{ii}$ are monotonically reduced (34) as the factorization progresses. This means that the $d_i$ never become negative and then later return to positivity. Therefore, any negative $d_i$ is solely due to computational inaccuracies and is set to zero.

Just as computational inaccuracies can lead to negative $d_i$, they can conspire to produce $d_i$ that are positive but are known with insufficient precision to distinguish them from zero. The precision to which a $d_i$ is known can be determined using the structure of the computation and the numerical precision with which computations are made.

Numerical computations are performed with floating point numbers. Floating point numbers are irregularly spaced samples of the real numbers. For a given precision, the smallest number that can be added to one and produce a number different than one is $\epsilon$. For numbers larger than one the difference between two successive floating point numbers $N_n$ and $N_{n+1}$ is approximately $\epsilon \cdot N_n$.

This means that before factorization, the initial granularity or uncertainty in each $a_{ii}$ is $\epsilon \cdot a_{ii}$. Since the $a_{ii}$ are only altered through subtraction the initial uncertainty can never improve. Therefore, if any $d_i$ falls below its initial uncertainty, u, it is indistinguishable from zero and is set to zero. To guard against pathological error combinations, u is multiplied by a small positive integer $\kappa$.

The preceding modifications of the Cholesky factorization ensure that elements of D that are indistinguishable from zero are replaced with zero. The reason for carefully winnowing inaccurate $d_i$ is that division by zero is used as a signaling event. Any value divided by zero during factorization or back substitution is replaced with zero. Application of this rule has the affect of "removing" the rows and columns of zero $d_i$ from the computation. Since zero $d_i$ are associated with underdetermined terms of the approximating polynomial, when zeroed rows and columns are "removed" from the computation the result is the same as if the associated underdetermined parameter was not included in the first place.

FIG. 1 shows how the zero-divide-by-zero rule "removes" rows and columns in an example second order system that has insufficient support for the polynomial term in xy. First the elements of a zeroed row and column are not used outside of that row and column until after the associated diagonal element is zeroed. Second the elements labeled 0' are never used outside of the zeroed row and column. Third, the elements labeled 0" are zeroed by subsequent division by zero (35). Fourth, elements labeled 0''' to the right of the zeroed $d_i$ are effectively zero since they are always multiplicatively paired (34) with their mirror element 0" below $d_i$.

Zero propagation carries through forward and backward substitution as well. The $a_{if}$ of (37) that are in zeroed columns are the elements 0". Finally, division by zero $a_{ii}$ in (36) results in a zero polynomial coefficient for a "removed" row and column.

The modified Cholesky factorization for positive semidefinite matrices is shown in FIG. 2. Forward and backward substitution including zero propagation are shown in FIG. 3. The divide by zero check adds $$\frac{|P| \cdot (|P| - 1)}{2}$$

comparisons to factorization and $|P|$ comparisons to substitution. Also added to factorization are $|P|-1$ multiplications for calculating the lower bound for $a_{ii}$ and $|P|-1$ comparisons for comparing $a_{ii}$ against the bound.

Initializing and Solving the Normal Equations

The least squares system matrix A is initialized from a moment vector by scattering natural moments according to equations (29–32). When the Cholesky method of the previous section is used to factor A, only the entries on and above the diagonal need be initialized. The entries below the diagonal are filled during factorization. FIG. 4 and FIG. 5 are procedures for initializing the upper diagonal elements of zero order and first order system matrices respectively. Extension to second and third order systems is straightforward and not shown.

The least squares parameter vector b is initialized by gathering forcing moments according to equations (28). FIG. 6 and FIG. 7 are procedures for using a moment vector to initialize the zero order and first order parameter vectors respectively. Extension to second and third order systems is straightforward and not shown.

Solution for the least squares polynomial of a moment vector entails filling an appropriate system matrix and parameter vector, factoring the system matrix, and performing forward and backward substitution on the parameter vector. The complete procedure is shown in FIG. 8.

Error Computation

The natural and forcing moments are also useful for determining the squared error between a domain's pixels and its approximating surface. The approximating surface does not have to be the least squares surface. The squared error over a domain can be expressed in terms of its energy moment and particular evaluations of the approximating surface using the domain's moments. A forced evaluation of an approximating polynomial over a domain is performed using the polynomial's coefficient vector and the domain's forcing moments. A natural evaluation is performed using a domain's natural moments.

Given a polynomial with coefficient vector c, the zero order forced evaluation over the domain with moment vector S is $$F_{v0}(S,c) := c\_S_z \qquad (38)$$

and the analogous zero order natural evaluation is $$N_{v0}(S,c) := c\_(c\_S). \qquad (39)$$

Higher order evaluations are extensions of lower order evaluations. The first, second and third order evaluations are $$F_{v1}(S,c) := c_y S_{yz} + c_x S_{xz} + F_{v0} \qquad (40)$$

$$N_{v1}(S,c) := c_y(2c\_S_y + c_y S_y^2) + c_x(2(c\_S_x + c_y S_{xy}) + c_x S_x^2) + N_{v0} \qquad (41)$$

$$F_{v2}(S,c) := c_{xy} S_{xyz} + c_y^2 S_y^2_z + c_x^2 S_x^2_z + F_{v1} \qquad (42)$$

$$N_{v2}(S,c) := c_{xy}(2(c\_S_{xy} + c_y S_{xy}^2 + c_x S_x^2_y) + c_{xy} S_x^2_y^2) + c_y^2(2(c\_S_y^2 + c_y S_y^3 + c_x S_{xy}^2 + c_x S_{xy}^3) + c_y^2 S_y^4) + c_x^2(2(c\_S_x^2 + c_y S_x^2_y + c_x S_x^3 + c_{xy} S_x^3_y + c_y^2 S_x^2_y^2) + c_x^2 S_x^4) + N_{v1} \qquad (43)$$

$$F_{v3}(S,c) := c_{xy}^2 S_{xy}^2_z + c_x^2_y S_x^2_{yz} + c_y^3 S_y^3_z + c_x^3 S_x^3_z + F_{v2} \qquad (44)$$

$$N_{v3}(S,c) := c_{xy}^2(2(c\_S_{xy}^2 + c_y S_{xy}^3 + c_x S_x^2_y^2 + c_{xy} S_x^2_y^3 + c_y^2 S_{xy}^4 + c_x^2 S_x^3_y^2)$$

$$+c_{xy}^2 S_x^2_y^4) + c_x^2_y(2(c\_S_x^2_y + c_y S_x^2_y^2 + c_x S_x^3_y + c_{xy} S_x^3_y^2 + c_y^2 S_x^2_y^3 +$$

$$c_x^2 S_x^4_y + c_{xy}^2 S_x^3_y^3) + c_x^2_y S_x^4_y^2) + c_y^3(2(c\_S_y^3 + c_y S_y^4 + c_x S_{xy}^3 + c_{xy} S_{xy}^4$$

$$+c_y^2 S_y^5 + c_x^2 S_x^2_y^3 + c_{xy}^2 S_{xy}^5 + c_x^2_y S_x^2_y^4)$$

$$+c_y^3 S_y^6) c_x^3(2(c\_S_x^3 + c_y S_x^3_y + c_x S_x^4 + c_{xy} S_x^4_y + c_y^2 S_x^3_y^2 + c_x^2 S_x^5 +$$

$$c_{xy}^2 S_x^4_y^2 + c_x^2_y S_x^5_y + c_y^3 S_x^3_y^3) + c_x^3 S_x^6) + N_{v2}. \qquad (45)$$

Given a forced evaluation and a natural evaluation of a particular order, the total squared error between a domain's pixels and its approximating polynomial is $$E(S,c) := S_z^2 - 2F_v(S,c) + N_v(S,c). \qquad (46)$$

If the polynomial used to evaluate $F_v$ and $N_v$ is the least squared error polynomial then $$F_v(S,c) = N_v(S,c) \qquad (47)$$

and the total squared error is either $$E_F(S,c) := S_z^2 - F_v(S,c) \qquad (48)$$

or $$E_N(S,c) := S_z^2 - N_v(S,c). \qquad (49)$$

The forced error computation (48) is much faster than the natural error computation (49) and is preferred if forcing moments are available. If the approximating polynomial is not the least squares polynomial the general error computation (46) must be used.

Moment Vector Alteration Operators

Once a moment vector is available for a given domain, the methods previously described show how a fixed number of mathematical operations can determine the domain's least squares approximating surface and the squared error between that surface and its pixels. These procedures are maximally useful for image partitioning, however, only if new moment vectors can easily be found for domains undergoing transformation. For certain domain transformations, efficient moment vector alteration operators do exist.

A common domain transformation is merging two domains. The corresponding merged moment vector is formed by element by element addition of two moment vectors $$\mathrm{merge}(B,C) := B+C. \qquad (50)$$

A similar operation forms a new moment vector when one domain is excised from another $$\mathrm{excise}(B,C) := B-C. \qquad (51)$$

Another important domain transformation is transferring pixels from one domain to another. The corresponding moment vectors are altered by adding and removing the contribution of the transferred pixels. A pixel is contributed to a moment vector by adding the appropriate term in $x_p^i y_p^j z_p^k$ to each of its elements. A pixel contribution is removed from a moment vector by the corresponding subtraction. FIG. 9 shows the pixel addition procedure and FIG. 10 shows the corresponding subtraction procedure. Note that only one multiplication and one addition per moment sum are required.

In certain situations the intensity component of an individual pixel's contribution to a moment vector must be altered. While this can be accomplished by adding and removing the altered pixel, a more efficient procedure is to directly adjust the forcing moments. The zadjust( ) procedure of FIG. 11 performs the direct adjustment.

Polynomial Evaluation

With appropriate use of moment vectors there is typically no need to evaluate a polynomial during partitioning. However, to reconstruct an image from an extracted model, polynomial evaluation must be performed for each pixel of the image. Because applications such as image coding require rapid model reconstruction, a fast method for performing polynomial evaluation is desirable.

A two-dimensional polynomial is efficiently evaluated at a coordinate (x,y) by extending Horner's rule for single dimensional polynomials to two dimensions $$\mathrm{eval}_0(c,x,y) := c\_, \qquad (52)$$

$$\mathrm{eval}_1(c,x,y) := xc_x + yc_y + c\_, \qquad (53)$$

$$\mathrm{eval}_2(c,x,y) := x(xc_x^2 + c_x) + y(yc_y^2 + c_y + xc_{xy}) + c\_, \qquad (54)$$

$$\mathrm{eval}_3(c,x,y) := x(x(xc_x^3 + c_x^2) + c_x) + y(y(yc_y^3 + c_y^2) + c_y + x(c_{xy} + xc_x^2_y + yc_{xy}^2) + c\_). \qquad (55)$$

Note that just as in one dimension the two-dimensional Horner evaluation only becomes non-trivial for orders higher than one.

Coordinate Transformations

Due to precision constraints, coefficient vectors and moment vectors may have differing reference coordinate systems. Because of this, it is desirable to be able to efficiently transform the reference coordinate system of a coefficient or moment vector. For one-dimensional polynomials the reference coordinate system is efficiently shifted by another method attributed to Horner. This method is most easily extended to two dimensions if shifts in each dimension are performed separately. Two-dimensional extensions of Horner's method for performing shifts in x and y are shown in FIG. 12 and FIG. 13 respectively. A general shift is achieved by sequentially performing shifts in each dimension as shown in FIG. 14.

Figure 15:
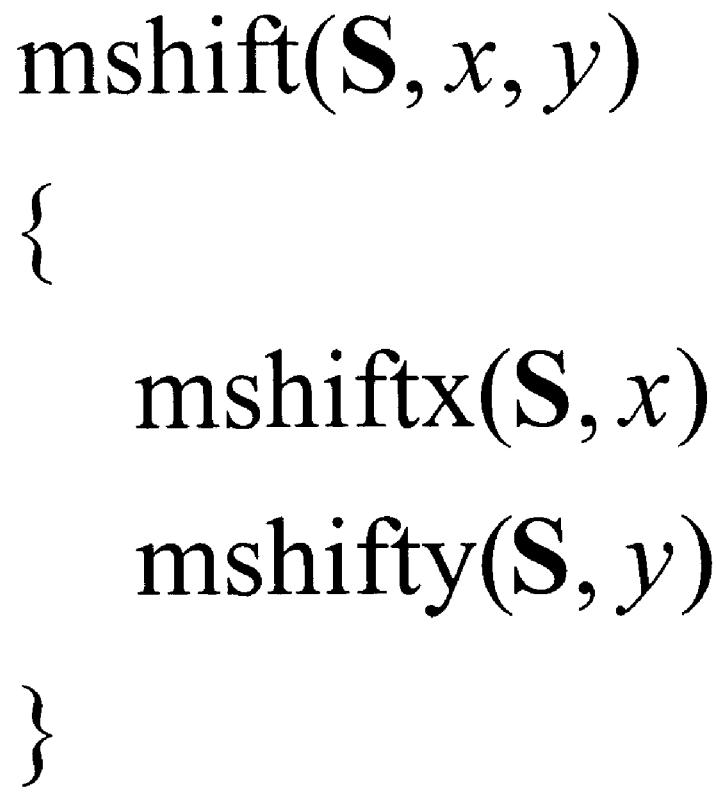

The fastest procedure for shifting moment vectors results if transformations in each coordinate are made separately and sequentially as in FIG. 15. A variant of Horner's method again yields the most efficient shift procedure. Procedures for shifting two-dimensional moment vectors in x and y are shown in FIG. 16 and FIG. 17 respectively. The first triply nested loop in each procedure shifts the natural moments, the second shifts the forcing moments.

Storage Requirements and Operation Counts

TABLE 1

Matrix/Vector Sizes

| Matrix/Vector | Size | Zero | One | Two | Three |
|---|---|---|---|---|---|
| P | $\dfrac{(P_{max} + 1)(P_{max} + 2)}{2}$ | 1 | 3 | 6 | 10 |
| U | 1 | 1 | 1 | 1 | 1 |
| F | $|P|$ | 1 | 3 | 6 | 10 |
| N | $\dfrac{(2P_{max} + 1)(2P_{max} + 2)}{2}$ | 1 | 6 | 15 | 28 |
| M | $|U| + |F| + |N|$ | 3 | 10 | 22 | 39 |
| A | $|P|^2$ | 1 | 9 | 36 | 100 |

Sizes of coefficient and moment vectors and least squares system matrices for each maximum polynomial order are summarized in Table 1. Note that the size of coefficient and moment vectors is $O(P_{max2})$. This contrasts with vectors obtained from one dimensional polynomials where size is linear in $P_{max}$. The size of the system matrix is $O(|P|^2)$ and therefore $O(P_{max}^4)$.

Since many moment vectors are typically in use at once, their storage requirements are more critical than those for coefficient vectors or system matrices. The amount of memory needed to hold a vector is dependent upon the element precision. For 32 bit integers, multiply the numeric columns of the table by four to obtain the number of bytes necessary to hold a single vector.

At higher precision either 64 bit integers or double precision floating point numbers require 8 bytes per vector element. Since only the 53 bit mantissa of a double precision number is useful for holding moment sums, use of the equivalent sized integer is preferable. In situations where 53 bit sums are adequate to prevent overflow and available double precision arithmetic is faster than 64 bit integer arithmetic, double precision moment vectors may have utility. With additional implementation effort, storage requirements can be further reduced by using lower precision for smaller moments and higher precision for larger moments.

TABLE 2

Algorithmic Complexity

| Algorithm | Dominant Operation Count | Zero | One | Two | Three |
|---|---|---|---|---|---|
| eval() | $|P| - 1$ | 0 | 2 | 5 | 9 |
| pshifty() | $\dfrac{P_{max}}{3}|P|$ | 0 | 1 | 4 | 10 |
| pshiftx() | $\dfrac{P_{max}}{3}|P|$ | 0 | 1 | 4 | 10 |
| pshift() | $\dfrac{2P_{max}}{3}|P|$ | 0 | 2 | 8 | 20 |
| merge() | $|M|$ | 3 | 10 | 22 | 39 |
| excise() | $|M|$ | 3 | 10 | 22 | 39 |
| add() | $|M|$ | 3 | 10 | 22 | 39 |
| remove() | $|M|$ | 3 | 10 | 22 | 39 |
| zupdate() | $|F| + 2$ | 2 | 5 | 8 | 12 |
| factor() | $\dfrac{|P| \cdot (|P| - 1) \cdot (|P| + 1)}{6}$ | 0 | 4 | 35 | 165 |
| substitute() | $|P| \cdot (|P| - 1)$ | 0 | 6 | 15 | 45 |
| $F_v()$ | $|P|$ | 1 | 3 | 6 | 10 |
| $N_v()$ | $|P| + \dfrac{|P| \cdot (|P| + 1)}{2}$ | 2 | 9 | 27 | 65 |
| mshiftx() | $\dfrac{2P_{max}}{3}|N| + \dfrac{P_{max}}{3}|F|$ | 0 | 5 | 24 | 66 |
| mshifty() | $\dfrac{2P_{max}}{3}|N| + \dfrac{P_{max}}{3}|F|$ | 0 | 5 | 24 | 66 |
| mshift() | $\dfrac{4P_{max}}{3}|N| + \dfrac{2P_{max}}{3}|F|$ | 0 | 10 | 48 | 132 |

Table 2 shows the number of scalar operations performed by each vector or matrix operation. The dominant operation count is formulated in terms of $P_{max}$ (or vector sizes previously defined in terms of $P_{max}$) in column 2. The actual operation counts for orders zero through three are shown in columns 3 through 6 respectively. The dominant operation counted in the table is addition for merge( ) and excise( ), and multiply-add for all other operators. For clarity of presentation the operation counts shown in Table 2 may be slightly lower than the actual dominant operation counts. For example the moment vector operators add( ) and remove( ) require $|M|$ additions but only $|M|-4$ multiplications.

Polynomial evaluation is the fastest operation, requiring just less than one operation per polynomial term. Polynomial shifts are $O(P_{max}^3)$, but a full shift requires only twice as many operations as evaluation even for order three. The moment vector alteration operators merge( ), excise( ), and add( ), remove( ), and zadjust( ) require approximately one scalar operation per affected vector element.

The Cholesky factorization for positive semidefinite matrices has the highest asymptotic complexity at $O(P_{max}^6)$. Substitution is computationally simpler at $O(P_{max}^4)$ but makes the combined factorization/substitution cycle even more expensive. Further, the $$\frac{|P| \cdot (|P| - 1)}{2}$$

and $|P|-1$ divisions performed in factorization and substitution are not counted in Table 2. At order three, factorization/substitution is significantly more computationally expensive than other operations.

The operations necessary to extended the Cholesky method to semidefinite systems also add slightly to the computational requirements. However, the additional divide by zero checks can be handled via an exception mechanism and need only add to the computation when division by zero is actually encountered. For definite systems, the only operations added by the semidefinite extensions are the $|P|-1$ multiplications and $|P|-1$ comparisons necessary to manage the lower bound on $a_{ii}$. Overall, the modified Cholesky method is extremely successful in minimizing the cost of solving small semidefinite systems.

One of the most important observations reinforced by Table 2 is that a forced polynomial evaluation is performed using only one more scalar operation than evaluation of the polynomial at a single point. This means that no matter how large a domain may be, if its forcing moments are available and its least squared error polynomial is known, the least squared error over the domain is calculable with only $|P|+1$ scalar operations. Natural evaluation is more expensive at $O(P_{max}^4)$ and should be used only where forcing moments are not available or where the comparison polynomial is not the least squared error polynomial for the domain. Note that a natural evaluation at first appears to require more multiplications than additions. However, multiplication by two is most efficiently implemented with addition. Accounting for times two multiplication as addition evens the requirements.

At $O(P_{max}^3)$ the asymptotic complexity of a moment vector shift is identical to a coefficient vector shift. However, moment vector shift requires approximately six times the computational effort of coefficient vector shift and rivals that of factorization/substitution for the polynomial orders of interest.

Precision and Overflow

Since pixel coordinates and values take on only integer values, moment vectors associated with domains in an image partition also take on only integer values. Further, moment vectors typically undergo many transformations during partitioning. For example, if moment vectors are used in a region growing partitioning process, they are typically merged many times.

If floating point numbers are used to store moments the accuracy of the sums can degrade considerably over a sequence of transformations. If integers are used to store moments, vector transformations can be made with perfect accuracy as long as overflow does not occur.

However, if a fixed coordinate system is used, moment sums associated with domains only small distances from the origin can grow quite large. For example, if moments are stored in 32 bit signed integers, pixels can be no further than $$\sqrt[6]{2^{31}} = 35$$

rows or columns from the origin before even a single pixel causes overflow of the largest third order moments. Since 70×70 pixels is not a very large image and since domains typically contain more than one pixel even further limiting maximum image size, larger integers must typically be used to hold moments when using a fixed coordinate system.

If each domain has its own centroidal coordinate system then domain size, not domain location determines moment overflow. Integers can still be used to hold moment sums if the coordinate system origin is not exactly centroidal but is located at the nearest round coordinate. A centroidal coordinate system is only advantageous if coordinate transformations are made directly to moment vectors without reconstituting the sums in the new coordinate system.

Efficient procedures for shifting moment vectors without reconstitution have been previously described. Because of the relatively large cost of performing a moment vector shift, the lower vector precision potentially afforded by centroidal moments must be carefully balanced against the increased computation incurred by required vector shifts. In general, the closer a moment vector's coordinate origin is kept to its centroid, the more often it must be shifted. Conversely, the farther it is allowed to drift, the larger its moment sums become. Given a certain precision and a fixed coordinate system, the largest useable image is obtained using the following techniques.

The traditional image processing view of an image places the coordinate origin at the upper left corner with x synonymous with column number and increasing to the right and with y synonymous with row number and increasing downward. The traditional axis is labeled xy on FIG. 18. Relative to the traditional axis, all coordinates and therefore all moment sums are positive. This eliminates the need for a sign bit and unsigned integers can be used for storing moments.

In most useful image size/moment precision combinations the first moments to overflow are the highest order natural moments. The largest natural moments are associated with domains farthest from the coordinate origin. For a given image size, the maximum distance from the coordinate origin is minimized if the origin is placed at the center of the image. The bit savings for central placement is equivalent to the highest power used in forming the moment sums. For first order moments, two magnitude bits are saved and for third order moments six magnitude bits are saved. This savings outweighs the increased cost incurred by requiring a sign bit. On FIG. 18 the central axis, x'y', are placed to retain integer pixel coordinates.

When moments are stored as integers, it is critical to avoid overflow. The most straightforward way to avoid overflow is to use a large enough integer so that the largest moments for a single domain covering the entire image do not overflow. For a given moment order the image size at which overflow becomes possible can be calculated via combinatorial analysis. The largest safe square image size is shown in Table 3 for various combinations of maximum polynomial order and integer size. An * indicates no practical limit to image size. Note that for up to second order moments, very large images can be accommodated by 64 bit integers.

TABLE 3

| | Largest Square Image Guaranteeing No Moment Overflow | | |
|---|---|---|---|
| Order | 32 bits | 53 bits | 64 bits |
| 1 | 474 | * | * |
| 2 | 82 | 840 | 3372 |
| 3 | 32 | 210 | 548 |

Since a single domain encompassing an entire image is not encountered in practical applications, guaranteeing moment integrity by limiting use to safe image size is somewhat wasteful. However, for many commonly encountered images a single background domain may encompass a large fraction of the image. Because of this it is not practical to determine a safe image size other than the single domain safe size.

It is practical, though, to check for moment overflow and disallow moment alteration operations that cause overflow. Disallowing overflow alterations on unsafe images prevents large domains from forming near the image periphery. The effect for images slightly larger than safe size is for partitions to have slightly more domains than might otherwise result.

Since the highest order pure moments will overflow first, to bounds check the natural moments only two comparisons must be made. From an implementation perspective the most convenient place to bounds check is during error computations. Typically a partitioning process creates one or more temporary moment vectors reflecting the result of a proposed transformation. Error computations are then made on the temporary vectors and only the most favorable transformations are performed.

By checking moment bounds and returning a maximum error value, an error computation can prevent transformations that result in overflow. A method for checking for overflow of signed integer moments during a forced error computation is shown in FIG. 19.

Moment bounds checking has been experimentally verified on 640×480 pixel, 256 gray-level images using 64 bit integers to hold third order moments. In the experiments, Cholesky factorization, substitution, and error computation were performed using double precision floating point arithmetic.

APPLICATIONS

The motivation for the initial work on moment operators was the problem of developing a piecewise-smooth image model via domain growing. When growing domains one essential question is posed quite often and therefore needs to be answered quickly.

If two domains are modeled via least squares polynomial surfaces, what is the increase in error if they are merged and modeled by a single polynomial?

The change in error together with additional model complexity criteria determine the order in which domains are merged. Using straightforward methods the number of mathematical operations necessary to calculate ΔE is proportional to the number of pixels in the proposed combination. However, if moment vectors are available for each of the unmerged domains, moment operators can provide ΔE with fixed effort. FIG. 20 shows a procedure for using moment operators to obtain ΔE. The procedure consists of merging two moment vectors, solving three systems of normal equations, and performing three forced error computations. If error measurements for each unmerged domain are previously available, only one solution and one forced error computation are required.

Another application of moment operators arises when optimizing the boundaries of a piecewise-smooth image partition. The shape of a boundary is altered by transferring pixels from one domain to another. Again one question arises that must be answered quickly.

If two domains are modeled via least squares polynomial surfaces, what is the increase in error if a group of pixels is transferred from one domain to another?

The change in error together with additional boundary shape criteria determines which transformations are performed. To calculate ΔE using moment operators, a boundary optimizer first forms a moment vector from the transferring pixels via a succession of add operations on an empty vector. Then, using the transferring moment vector and moment vectors for each initial domain, performs the procedure of FIG. 21. The move_delta( ) procedure first forms a new moment vector by merging the moment vector containing the transferring pixels, $M_v$, and the moment vector of the domain receiving the pixels. A second vector is then formed by excising the transferring moment vector from the donating moment vector. Solutions for the domains before and after transfer are the obtained and ΔE is found using four forced error computations. If error measurements for each original domain are previously available only two solutions and two forced error computations are required.

Another application of moment operators comes from application of the piecewise-smooth image model to lossy image coding. In a partition based image coder it is important to be able to represent a domain's least squares polynomial using a minimum number of bits. Further, using fewer bits should smoothly degrade the representation. One way to achieve these goals is to sample the surface over a domain, quantize and code the sample values, and reconstruct the polynomial from the samples. By critically sampling the surface, only one sample point is needed per polynomial term. A geometry implicit sampler determines the locations of critical sample points solely from a domain's shape. Subject to shape determined restrictions, the sample points are located such that the polynomial reconstructed from the samples is minimally sensitive to changes in sample point values.

Given an adequate sampling, the accuracy of the reconstructed surface is completely determined by the accuracy of the samples. Placing no restrictions on sample precision yields a reconstructed surface closely matching the least squares surface. However, if the sampled values are limited to a relatively small number of intensities via quantization, the accuracy of the reconstructed surface smoothly degrades as the difference between allowable values increases.

Heavy quantization may yield a reconstructed surface that significantly diverges from the least squares surface. The accuracy of the reconstruction may be improved by perturbing one or more sample points into adjacent quantizer buckets. In a procedure that optimizes a sample-reconstructed surface by perturbing sampled values, moment operators are again useful for answering a central question.

If a sample point valve is perturbed, what is the error change between the perturbed surface reconstructed from the samples and the actual data that the surface approximates?

The change in error determines which perturbations are performed. FIG. 22 shows how moment operators can be used to determine ΔE. The adjust_error( ) procedure of the figure has several parameters. The parameter $M_S$ is a moment vector formed from the sample points. The moment vector $M_A$ is formed from the pixel contributions of the entire domain.

Because the natural moments are unaffected by a value adjustment and because the same factored matrix is useable for an entire sequence of value adjustments on the same domain, it is not necessary to factor the sample moment matrix more than once for a single domain. The parameter $A_S$ is a matrix that can optionally be filled from the natural moments of the sample points and Cholesky factored. The parameter f determines whether or not the matrix is factored and is set to a nonzero value to force factorization and to zero to reuse a previous factorization.

The adjust_error( ) procedure first fills and factors $A_S$ if f is nonzero. It then calculates the error between the unperturbed surface and the domain's pixels. If an unperturbed error measurement is previously available, this computation is unnecessary. After adjusting the sampled moment vector to reflect a change in sample point value, the adjusted moments and the factored sample point matrix, $A_S$, are used to reconstruct a polynomial through the sample points. The reconstructed polynomial is then compared against the domain's pixels using a general error computation. Finally, the error change is computed by subtracting the old error from the new.

I claim:

1. An image partitioning process comprising the steps of:
   a) processing an input digital image to obtain an initial seed partition, and
   b) modeling said partition with a piecewise-polynomial surface of order one, two, or three, and
   c) transforming said partition by repeating until at least one transformation is performed the steps of:
   i) determining a proposed partition transformation to be applied to said initial seed partition, and ii) obtaining one or more initial moment vectors for the domains affected by the proposed transformation, and iii) performing one or more moment alteration operations on at least one said initial moment vector to form at least one altered moment vector, and iv) arranging the moments comprising each said altered moment vector into a symmetric matrix A and vector b, such that the lowest order natural moments comprise the first row and column of A without replication, the natural moments whose subscripts correspond to the multiplication of the heads of each intersecting row and column comprise the rows and columns of A subsequent to the first, and the forcing moments comprise the elements of b, and v) solving each said system of equations represented by said matrices A and vectors b to yield an altered coefficient vector, and vi) using each altered coefficient vector together with an initial or altered moment vector, performing a forced, natural, or general error computation to yield one or more altered error measurements, and vii) obtaining initial error measurements for the domains affected by the proposed transformation, and viii) using said initial error measurements and said altered error measurements determining the error change produced by the proposed transformation, and ix) using said error change determining whether the transformation should be performed, and x) performing said transformation if so determined, and d) generating a representation of said transformed partition suitable for subsequent image processing.

2. The method defined in claim 1 wherein the proposed transformation is merging two domains, and wherein a) a first said initial moment vector is formed from the pixel contributions of a first domain and a second said initial moment vector is formed from the pixel contributions of a second domain and wherein b) the single moment vector alteration operation performed is merging said first and second initial moment vectors and wherein c) the single altered error measurement is performed via a forced error computation using the single altered coefficient vector and the single altered moment vector.

3. The method defined in claim 1 wherein the proposed partition transformation is transferring a relatively small number of pixels from one domain to a second domain and wherein a) a first said initial moment vector is formed from the pixel contributions of a first domain and a second said initial moment vector is formed from the pixel contributions of a second domain and wherein b) said first initial moment vector is altered by adding a relatively small number of contributions from the second said domain and the second said initial moment vector is altered by removing the same relatively small number of pixel contributions and wherein c) a first altered error measurement is performed via a forced error computation using the first altered coefficient vector and the first altered moment vector, and a second altered error measurement is performed via a forced error computation using the second altered coefficient vector and the second altered moment vector.

4. The method defined in claim 1 wherein the proposed transformation is altering a sample-reconstructed surface over a domain and wherein a) a first said initial moment vector is formed from the pixel contributions of an initial domain, and a second said initial moment vector is formed from the sample contributions of a critically sampled surface over said initial domain and wherein b) the single moment vector alteration operation performed is updating the intensity contribution of one of the samples contributing to said second initial moment vector and wherein c) the single altered error measurement is performed via a general error computation using said single altered coefficient vector and the first said initial moment vector.

5. The method defined in claim 1 wherein the matrices A and vectors b are solved using an extension of the Cholesky factorization for symmetric positive definite systems to semidefinite systems comprising the steps of:

a) arranging the system matrix A and parameter vector b such that lower order polynomials are embedded in higher order polynomials, b) performing the Cholesky factorization for symmetric positive definite matrices on the resulting system matrix with the additional steps of:

i) forming for each column other than the first a lower bound for the diagonal element of that column, ii) replacing with zero at the point of computation any diagonal element found to be more negative than its lower bound, iii) replacing any quotient obtained by division with zero with zero, c) using the factored matrix to perform forward and backward substitution on the system parameter vector with the additional steps of:

i) replacing any quotient obtained by division with zero with zero.

6. The method defined in claim 1 wherein the highest order pure natural moments of any altered moment vectors are bounds checked, and alterations resulting in moment overflow are disallowed.

* * * * *